United States Patent
Kwon

(10) Patent No.: US 11,909,043 B2
(45) Date of Patent: Feb. 20, 2024

(54) POSITIVE ELECTRODE FOR ALL-SOLID SECONDARY BATTERY AND ALL-SOLID SECONDARY BATTERY INCLUDING THE SAME

(71) Applicant: Samsung SDI Co., Ltd., Yongin-si (KR)

(72) Inventor: Taeri Kwon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 199 days.

(21) Appl. No.: 17/190,733

(22) Filed: Mar. 3, 2021

(65) Prior Publication Data
US 2021/0280865 A1 Sep. 9, 2021

(30) Foreign Application Priority Data
Mar. 3, 2020 (KR) .................. 10-2020-0026798

(51) Int. Cl.
*H01M 4/525* (2010.01)
*H01M 4/36* (2006.01)
(Continued)

(52) U.S. Cl.
CPC ........... *H01M 4/525* (2013.01); *H01M 4/131* (2013.01); *H01M 4/366* (2013.01);
(Continued)

(58) Field of Classification Search
None
See application file for complete search history.

(56) References Cited

U.S. PATENT DOCUMENTS 9,564,628 B2 2/2017 Kim et al.
9,843,038 B2 12/2017 Yamada et al.
(Continued)

FOREIGN PATENT DOCUMENTS

CN 107732193 A 2/2018
JP 2008-234872 A 10/2008
(Continued)

OTHER PUBLICATIONS

Japanese Office Action, for Patent Application No. 2021-033301, dated Jan. 18, 2022, 4 pages.
(Continued)

*Primary Examiner* — Carlos Barcena
(74) *Attorney, Agent, or Firm* — Lewis Roca Rothgerber Christie LLP

(57) ABSTRACT

A positive electrode for an all-solid secondary battery including a sulfide-based solid electrolyte includes a first positive active material having an average particle diameter of about 15 μm to about 20 μm, a second positive active material having an average particle diameter of about 2 μm to about 6 μm, and a solid electrolyte, wherein at least one selected from the first positive active material and the second positive active material includes a coating layer including a lithium ion conductor, and each of the first positive active material and the second positive active material includes a core and a shell, wherein the shell includes a nickel-based active material containing cobalt. An all-solid secondary battery includes the positive electrode.

20 Claims, 5 Drawing Sheets

(51) Int. Cl.
*H01M 4/131* (2010.01)
*H01M 10/0525* (2010.01)
*H01M 4/02* (2006.01)

(52) U.S. Cl.
CPC .. *H01M 10/0525* (2013.01); *H01M 2004/028* (2013.01); *H01M 2300/0068* (2013.01)

(56) References Cited

U.S. PATENT DOCUMENTS

| | | |
|---|---|---|
| 10,128,507 B2 | 11/2018 | Ito et al. |
| 10,276,862 B2 | 4/2019 | Mun et al. |
| 10,826,057 B2 | 11/2020 | Hong |
| 10,873,084 B2 | 12/2020 | Ito et al. |
| 2010/0099027 A1 | 4/2010 | Kikuya et al. |
| 2012/0009474 A1 | 1/2012 | Yanagihara et al. |
| 2013/0302685 A1 | 11/2013 | Kim |
| 2014/0272565 A1 | 9/2014 | Gronwald |
| 2016/0006032 A1* | 1/2016 | Paulsen ............... H01M 4/366 429/231 |
| 2016/0049646 A1 | 2/2016 | Fujiki et al. |
| 2016/0079597 A1* | 3/2016 | Fujiki ............... H01M 10/0525 429/304 |
| 2016/0181597 A1 | 6/2016 | Kim |
| 2018/0212233 A1* | 7/2018 | Ito ................... H01M 10/0562 |
| 2019/0044146 A1 | 2/2019 | Ito et al. |
| 2019/0081321 A1 | 3/2019 | Oh et al. |
| 2019/0157660 A1 | 5/2019 | Jang et al. |
| 2019/0181432 A1 | 6/2019 | Yui et al. |
| 2019/0207254 A1 | 7/2019 | Sato et al. |
| 2021/0296691 A1 | 9/2021 | Kwon |
| 2021/0363027 A1 | 11/2021 | Toma et al. |

FOREIGN PATENT DOCUMENTS

| | | |
|---|---|---|
| JP | 2008-251532 A | 10/2008 |
| JP | 2012-018827 A | 1/2012 |
| JP | 2012-248468 A | 12/2012 |
| JP | 2014-116149 A | 6/2014 |
| JP | 2016-042417 A | 3/2016 |
| JP | 2016-062683 A | 4/2016 |
| JP | 2016-103411 A | 6/2016 |
| JP | 2019-096612 A | 6/2019 |
| JP | 2019-106286 A | 6/2019 |
| JP | 2019-175830 A | 10/2019 |
| KR | 10-2013-0125236 A | 11/2013 |
| KR | 10-2014-0053451 A | 5/2014 |
| KR | 10-2014-0074174 | 6/2014 |
| KR | 10-2014-0074174 A | 6/2014 |
| KR | 10-2016-0010296 A | 1/2016 |
| KR | 10-2016-0075196 A | 6/2016 |
| KR | 10-1897365 B1 | 9/2018 |
| KR | 10-2019-0029187 A | 3/2019 |
| WO | WO 2017-057078 A | 4/2017 |
| WO | WO 2018-062079 A | 4/2018 |
| WO | WO 2019-163846 A | 8/2019 |

OTHER PUBLICATIONS

Japanese Office Action, for Patent Application No. 2021-033438, dated Jan. 18, 2022, 3 pages.
Qian, Danna, et al., "Lithium Lanthanum Titanium Oxides: A Fast Ionic Conductive Coating for Lithium-Ion Battery Cathodes," Chemistry of Materials, 2012, 8 pages.
Shin, Ji-Woong, et al., "Core-Shell-Structured Li[Ni0.87Co0.08Al0.05]O2 Cathode Material for Enhanced Electrochemical Performance and Thermal Stability of Lithium-Ion Batteries," Journal of the Korean Physical Society, vol. 74, No. 1, Jan. 2019, pp. 53-56.
Yoo, Gi-Won, et al., "Novel design of core shell structure by NCA modification on NCM cathode material to enhance capacity and cycle life for lithium secondary battery," Ceramics International, vol. 41, 2015, pp. 1913-1916.
Yoon, Sung-Jun, et al., "Improved Performances of Li[Ni0.65Co0.08Mn0.27]O2 Cathode Material with Full Concentration Gradient for Li-Ion Batteries," Journal of The Electrochemical Society, vol. 162, 2015, pp. A3059-A3063.
EPO Extended European Search Report dated Jul. 22, 2021, issued in European Patent Application No. 21160577.9 (8 pages).
Ito, Seitaro, et al., "A rocking chair type all-solid-state lithium ion battery adopting Li2O—ZrO2 coated LiNi0.8Co0.15Al0.05O2 and a sulfide based electrolyte," Journal of Power Sources, 2014, vol. 248, pp. 943-950.
U.S. Office Action dated Sep. 21, 2022, issued in U.S. Appl. No. 17/190,770 (18 pages).
U.S. Final Office Action dated Feb. 6, 2023, issued in U.S. Appl. No. 17/190,770 (15 pages).
U.S. Office Action dated Jun. 2, 2023, issued in U.S. Appl. No. 17/190,770 (16 pages).
EPO European Office Action dated May 30, 2023, issued in European Patent Application No. 21160577.9 (5 pages).
U.S. Final Office Action dated Sep. 7, 2023, issued in U.S. Appl. No. 17/190,770 (16 pages).

* cited by examiner

POSITIVE ELECTRODE FOR ALL-SOLID SECONDARY BATTERY AND ALL-SOLID SECONDARY BATTERY INCLUDING THE SAME

CROSS-REFERENCE TO RELATED APPLICATION

This application claims priority to and the benefit of Korean Patent Application No. 10-2020-0026798, filed on Mar. 3, 2020, in the Korean Intellectual Property Office, the entire content of which is hereby incorporated by reference. This application includes subject matter related to co-pending and commonly owned U.S. patent application Ser. No. 17/190,770, filed Mar. 3, 2021, and on the same date as this application, the entire content of which is incorporated herein by reference.

BACKGROUND

1. Field

One or more aspects of embodiments of the present disclosure relate to a positive electrode for an all-solid secondary battery, and an all-solid secondary battery including the positive electrode.

2. Description of Related Art

Related art lithium secondary batteries use a liquid electrolyte and are readily ignited when exposed to water in the air, thus posing a stability problem. This stability issue is becoming more important as electric vehicles become more commercially viable. Accordingly, research has recently been actively conducted on all-solid-state secondary batteries using a solid electrolyte formed of an inorganic material, for the purpose of improving safety. All-solid-state secondary batteries are receiving attention as next-generation secondary batteries with the goals of improved stability, high energy density, high power output, long life, simplification of manufacturing processes, formation of large/compact batteries, and/or reduced costs.

An all-solid-state secondary battery includes a positive electrode, a solid electrolyte layer, and a negative electrode; has high internal resistance in a battery electrode; and generally uses a small-particle positive active material having small-size particles and high ionic conductivity.

However, when a small-particle positive active material is used, the positive electrode has a low mixture density and high resistance, which may decrease the high-rate characteristics and/or the lifespan characteristics of the battery, and thus improvements in this regard are desired.

SUMMARY

One or more aspects of embodiments of the present disclosure are directed toward a novel positive electrode for an all-solid secondary battery, and an all-solid secondary battery including the positive electrode.

Additional aspects will be set forth in part in the description that follows and, in part, will be apparent from the description, or may be learned by practice of the presented embodiments of the disclosure.

One or more example embodiments of the present disclosure provide:

a positive electrode for an all-solid secondary battery including a sulfide-based solid electrolyte including:

a first positive active material having an average particle diameter of about 15 μm to about 20 μm, a second positive active material having an average particle diameter of about 2 μm to about 6 μm, and a solid electrolyte, wherein at least one selected from the first positive active material and the second positive active material includes a coating layer including a lithium ion conductor, wherein each of the first positive active material and the second positive active material includes a core and a shell, and wherein the shell includes a nickel-based active material containing cobalt (Co).

One or more example embodiments of the present disclosure provide an all-solid secondary battery including a positive electrode; a negative electrode; and a solid electrolyte layer disposed between the positive electrode and the negative electrode, wherein the solid electrolyte layer includes the sulfide-based solid electrolyte.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
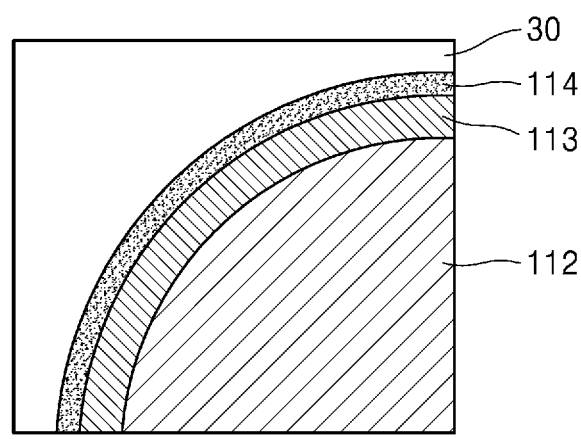
FIG. 1 shows a portion of a structure of a sulfide-based solid electrolyte disposed on a positive active material, according to an embodiment.

Reference will now be made in detail to embodiments, examples of which are illustrated in the accompanying drawings, wherein like reference numerals refer to like elements throughout and duplicative descriptions thereof may not be provided. In this regard, the present embodiments may have different forms and should not be construed as being limited to the descriptions set forth herein. Accordingly, the embodiments are merely described below, by referring to the drawings, to explain aspects of the present description. As used herein, the term "and/or" includes any and all combinations of one or more of the associated listed items. Expressions such as "at least one of," "one of," and "selected from," when preceding a list of elements, modify the entire list of elements and do not modify the individual elements of the list.

As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof. Further, the use of "may" when describing embodiments of the present disclosure refers to "one or more embodiments of the present disclosure."

Hereinafter, according to one or more embodiments, a positive electrode for an all-solid secondary battery, an all-solid secondary battery including the positive electrode, and a method of preparing the all-solid secondary battery will be described in detail with reference to the attached drawings.

According to an embodiment, a positive electrode for an all-solid secondary battery including a sulfide-based solid electrolyte includes: a first positive active material having an average particle diameter of about 15 µm to about 20 µm; a second positive active material having an average particle diameter of about 2 µm to about 6 µm; and a solid electrolyte, wherein at least one selected from the first positive active material and the second positive active material includes a coating layer including a lithium ion conductor, wherein each of the first positive active material and the second positive active material includes a core and a shell, and wherein the shell includes a nickel-based active material containing cobalt (Co). The lithium ion conductor may be a lithium zirconium oxide, a lithium titanium oxide, a lithium niobium oxide, a lithium lanthanum oxide, a lithium cerium oxide, or a combination thereof.

An amount of cobalt in the nickel-based active material containing cobalt in the shell may be about 30 mol % or higher.

An all-solid secondary battery has high internal resistance in the electrodes and generally uses a positive active material having a particle size of about 5 µm to about 10 µm, and having good ion conductivity. However, when such a positive active material is used, a mixture density of a positive electrode may be low, which may deteriorate the high-rate characteristics and/or the lifetime characteristics of the battery due to high resistance of the positive electrode plate, and thus improvements of the battery in this regard are desired.

An all-solid battery according to embodiments of the present disclosure has high energy density characteristics due to an increased positive electrode mixture density by utilizing a large-particle first positive active material and a small-particle second positive active material together (e.g., mixed) as a positive active material, and forming a coating layer including a lithium ion conductor on at least one selected from the first positive active material and the second positive active material. Also, each of the first positive active material and the second positive active material includes a core and a shell, wherein the (each) shell includes a nickel-based active material containing cobalt, which increases the structural stability of the positive active material by suppressing structural collapse of the positive active material with respect to an electrolyte solution, and thus an all-solid secondary battery having improved lifetime and high-rate characteristics may be obtained.

When at least one selected from the first positive active material and the second positive active material is coated with the lithium ion conductor, diffusion of Co, P, and/or S between the positive electrode and a sulfide-based solid electrolyte (e.g., in a solid electrolyte layer between the positive electrode and the negative electrode) may be suppressed, thereby preventing or reducing generation of a lithium depletion layer and decreasing the interfacial resistance of the all-solid secondary battery.

As used herein, the term "average particle diameter" refers to a particle diameter (D50) corresponding to 50% on a particle size distribution curve, in which all (e.g., the total number of) particles are arranged in the order of particle diameter from the smallest particle to the largest particle. Here, a total number of accumulated particles is 100%. The average particle diameter may be measured using any suitable method in the art. For example, the average particle diameter may be measured using a particle size analyzer, a transmission electron microscope (TEM), or a scanning electron microscope (SEM). In some embodiments, the average particle diameter may be measured by utilizing dynamic light-scattering. The method may include counting the number of particles within a set or predetermined size range, and calculating the average particle diameter therefrom. FIG. 1 shows a portion of the structure of a sulfide-based solid electrolyte 30 disposed on a positive active material according to an embodiment.

Referring to FIG. 1, at least one selected from a first positive active material and a second positive active material may have a shell 113 containing a nickel-based active material containing cobalt disposed on a core 112, and a coating layer 114 including a lithium ion conductor may exist on (over) the shell 113. An amount of cobalt in the nickel-based active material containing cobalt (e.g., in the shell 113) may be about 30 mol % or higher. The coating layer 114 may be in contact (e.g., direct contact) with the sulfide-based solid electrolyte 30.

When the shell 113 including the nickel-based active material containing cobalt is disposed as shown in FIG. 1, interfacial resistance between the sulfide-based solid electrolyte 30 and the positive electrode may decrease, and the capacity and/or the high-rate characteristics of the all-solid secondary battery may be further improved.

A thickness of the shell 113 including the nickel-based active material containing cobalt may be about 5 nm to about 100 nm, for example, about 10 nm to about 80 nm; and a thickness of the coating layer 114 including the lithium ion conductor may be about 1 nm to about 50 nm, for example, about 5 nm to about 30 nm.

In the nickel-based active material containing cobalt, an amount of cobalt may be about 30 mol % or higher, for example, about 30 mol % to about 60 mol %, about 35 mol % to about 58 mol %, about 38 mol % to about 56 mol %, or about 40 mol % to about 55 mol % with respect to 100 mol % of the transition metals in the nickel-based active material.

An amount of the nickel-based active material containing cobalt may be about 0.1 parts to about 10 parts by weight, for example, about 0.2 parts to about 8 parts by weight, about 0.3 parts to about 6 parts by weight, or about 0.5 parts to about 7 parts by weight, based 100 parts by weight of the total weight of the nickel-based active material including a core and a shell.

In the coating layer 114 containing the lithium ion conductor, an amount of the lithium ion conductor may be about 0.1 parts to about 5 parts by weight, for example, about 0.1 parts to about 3 parts by weight or about 0.1 parts to about 2 parts by weight, based on 100 parts by weight of the total weight of the nickel-based active material (including the core and the shell) and the lithium ion conductor The lithium ion conductor may be a compound represented by Formula 1:

$$a\text{Li}_2\text{O}-\text{ZrO}_2. \qquad \text{Formula 1}$$

In Formula 1, 0.1≤a≤2.0.

In some embodiments, the compound represented by Formula 1 may be, for example, $\text{Li}_2\text{O}-\text{ZrO}_2$.

The nickel-based active material containing cobalt is an active material containing nickel and cobalt, wherein an amount of cobalt may be about 30 mol % or higher based on the total amount (100 mol %) of transition metals including nickel and cobalt, and in some embodiments, an amount of nickel may be higher than the amounts of each of the other transition metals, including cobalt.

The nickel-based active material containing cobalt may be a compound represented by Formula 2:

$$Li_aNi_{1-x-y-z}Co_xM1_yM2_zO_2.$$  Formula 2

In Formula 2, M1 may be manganese (Mn) or aluminum (Al), M2 may be boron (B), magnesium (Mg), calcium (Ca), strontium (Sr), barium (Ba), titanium (Ti), vanadium (V), chromium (Cr), iron (Fe), copper (Cu), zirconium (Zr), aluminum (Al), or a combination thereof, $0.9 \le a \le 1.3$, $0.3 \le x \le 0.6$, $0.002 \le y \le 0.05$, $0 \le z < 1$, and $x+y+z \le 1$.

In Formula 2, an amount of nickel (Ni) may be about 40 mol % to about 70 mol %, an amount of cobalt (Co) may be about 30 mol % to about 60 mol %, and an amount of M1 may be about 0.2 mol % to about 5 mol %.

The compound represented by Formula 2 may be, for example, $LiNi_{0.47}Co_{0.5}Al_{0.03}O_2$, $LiNi_{0.88}Co_{0.105}Al_{0.015}O_2$, $LiNi_{0.917}Co_{0.069}Al_{0.014}O_2$, or $LiNi_{0.93}Co_{0.056}Al_{0.014}O_2$.

An amount of the first positive active material may be about 60 parts to about 80 parts by weight based on 100 parts by weight of the total weight of the first positive active material and the second positive active material. When the amount of the first positive active material is within this range, an all-solid secondary battery having a high energy density and good lifetime characteristics may be prepared.

In the positive electrode, an amount of the solid electrolyte may be about 5 parts to about 15 parts by weight, the total amount of the positive active material may be about 80 parts to about 90 parts by weight, an amount of a conducting agent may be about 0.5 parts to about 1 part by weight, and an amount of a binder may be about 1 part to about 2 parts by weight, each based on 100 parts by weight of the total weight of the positive electrode. Here, the positive active material may include the first positive active material and the second positive active material.

The first positive active material and the second positive active material may each independently be a compound represented by Formula 3:

$$Li_a(Ni_{1-x-y-z}Co_xM1_yM2_z)O_2.$$  Formula 3

In Formula 3, M1 may be manganese (Mn), aluminum (Al), or a combination thereof, M2 may be boron (B), magnesium (Mg), calcium (Ca), strontium (Sr), barium (Ba), titanium (Ti), vanadium (V), chromium (Cr), iron (Fe), copper (Cu), zirconium (Zr), aluminum (Al), or a combination thereof, and $0.95 \le a \le 1.3$, $x \le (1-x-y-z)$, $y \le (1-x-y-z)$, $0 < x < 1$, $0 \le y < 1$, and $0 \le z < 1$. In Formula 3, the total of the nickel, cobalt, M1, and M2 subscripts may be 1.

In Formula 3, $x+y+z \le 1$.

In Formula 3, $0 < x < 0.5$, and x may be about 0.005 to about 0.3, about 0.01 to about 0.25, or about 0.03 to about 0.20.

In Formula 3, $0 \le y < 0.5$, and y may be about 0.002 to about 0.05, about 0.003 to about 0.04, or about 0.004 to about 0.03. Also, $0 \le z < 0.5$, and z may be about 0.002 to about 0.05, about 0.003 to about 0.04, or about 0.005 to about 0.03.

In some embodiments, an amount of nickel in Formula 3 may be higher than each of the amounts of cobalt, M1, and M2. In Formula 3, $1-x-y$ may be in a range of about 0.8 to about 0.98 or about 0.8 to about 0.95.

In Formula 3, an amount of nickel may be about 80 mol % to about 98 mol %, for example, about 80 mol % to about 95 mol %. When the amount of nickel is within this range, a positive electrode having good capacity characteristics may be obtained. In some embodiments, an amount of cobalt may be about 0.5 mol % to about 30 mol %, for example, about 1 mol % to about 25 mol % or about 3 mol % to about 20 mol %.

In Formula 3, when M1 is manganese, an amount of manganese may be about 0.2 mol % to about 5 mol %, for example, about 0.3 mol % to about 4 mol %, or about 0.4 mol % to about 3 mol %. In some embodiments, when M1 is aluminum, an amount of aluminum may be about 0.2 mol % to about 5 mol %, for example, about 0.3 mol % to about 4 mol %, or about 0.5 mol % to about 3 mol %.

The compound represented by Formula 3 may be, for example, a compound represented by Formula 4 or a compound represented by Formula 5:

$$LiNi_{1-x-y}Co_xAl_yO_2.$$  Formula 4

In Formula 4, $0.005 \le x \le 0.6$ and $0.002 \le y \le 0.05$.

$$LiNi_{1-x-y}Co_xMn_yO_2.$$  Formula 5

In Formula 5, $0.005 \le x \le 0.6$ and $0.002 \le y \le 0.05$.

When the compound represented by Formula 4 is a cobalt-rich compound, $0.3 \le x \le 0.6$ and $0.002 \le y \le 0.05$. In Formula 4, $0.005 \le x \le 0.3$ and $0.002 \le y \le 0.05$.

In one embodiment, the compound represented by Formula 4 may include nickel in an amount of about 40 mol % to about 80 mol %, cobalt in an amount of about 30 mol % to about 60 mol %, and aluminum in an amount of about 0.2 mol % to about 5 mol %. In some embodiments, the compound represented by Formula 4 may include nickel in an amount of about 80 mol % to about 98 mol %, cobalt in an amount of about 30 mol % to about 60 mol %, and aluminum in an amount of about 0.2 mol % to about 5 mol %.

In one embodiment, the compound represented by Formula 5 may include nickel in an amount of about 40 mol % to about 80 mol %, cobalt on an amount of about 30 mol % to about 60 mol %, and manganese in an amount of about 0.2 mol % to about 5 mol %. In some embodiments, the compound represented by Formula 5 may include nickel in an amount of about 80 mol % to about 98 mol %, cobalt in an amount of about 30 mol % to about 60 mol %, and manganese in an amount of about 0.2 mol % to about 5 mol %.

In one embodiment, the compound represented by Formula 3 may be, for example, $LiNi_{0.896}Co_{0.072}Mn_{0.032}O_2$, $LiNi_{0.917}Co_{0.069}Al_{0.014}O_2$, $LiNi_{0.88}Co_{0.105}Al_{0.015}O_2$, $LiNi_{0.88}Co_{0.105}Mn_{0.015}O_2$, or $LiNi_{0.845}Co_{0.105}Mn_{0.05}O_2$.

Hereinafter, a method of preparing a positive active material according to an embodiment will be described.

The method may include adding and mixing a cobalt precursor to a first positive active material and/or a second positive active material to obtain a precursor mixture, and heat-treating the precursor mixture at a temperature of about 600° C. to about 800° C., for example, about 650° C. to about 750° C. to obtain a first positive active material or a second positive active material including a core including a first positive active material and/or a second positive active material, and a shell including a nickel-based active material containing cobalt. The heat-treating may be performed under an oxygen atmosphere or in air. In the nickel-based active material containing cobalt, an amount of cobalt may be about 30 mol % or higher.

Sodium hydroxide may be added to the precursor mixture to control a pH of the precursor mixture.

In some embodiments, the cobalt precursor may be cobalt sulfate, cobalt nitrate, cobalt oxide, or a combination thereof.

Subsequently, a coating layer including a lithium ion conductor may be formed on the positive active material. When the lithium ion conductor is the compound represented by Formula 1, the coating layer including a lithium ion conductor may be formed on the positive active material in the same manner as in the preparation method disclosed in the Korean Patent No. 10-2014-0074174 A, the entire content of which is incorporated herein by reference.

The positive active material may be obtained by mixing the first positive active material and the second positive active material by following the process described above.

A positive electrode having a mixture density of about 3.4 g/cm$^3$ to about 3.7 g/cm$^3$ may be prepared using the positive active material.

The starting materials, which are the first positive active material and/or the second positive active material subjected to be mixed with the cobalt precursor, may be prepared utilizing preparation methods in the related art. For example, an aluminum precursor or a manganese precursor, a nickel cobalt hydroxide, and a lithium precursor may be mixed to obtain a mixture, and the mixture may be heat-treated under an oxidizing gas atmosphere to prepare the starting materials (which are the first positive active material and/or the second positive active material).

A precursor containing a metal that is to be doped (e.g., a dopant metal precursor) may be added to the mixture. Non-limiting examples of the precursor include barium hydroxide, magnesium hydroxide, and titanium oxide.

The heat-treatment conditions may vary according to a type of the precursor, and a temperature of the heat-treatment may be, for example, about 600° C. to about 900° C., or, for example, about 650° C. to about 750° C. The oxidizing gas atmosphere may refer to, for example, air or an oxygen atmosphere.

The nickel cobalt hydroxide may be prepared utilizing suitable preparation methods in the related art, for example, a co-precipitation method. The nickel cobalt hydroxide obtained by following this preparation method may be divided into a large-particle nickel cobalt hydroxide and a small-particle nickel cobalt hydroxide.

According to another aspect of an embodiment, an all-solid secondary battery includes the positive electrode described above, a negative electrode, and a sulfide-based solid electrolyte disposed therebetween.

Hereinafter, an all-solid secondary battery according to one or more embodiments will be described in detail.

According to an embodiment, an all-solid secondary battery includes a positive electrode; a negative electrode; and a solid electrolyte layer disposed between the positive electrode and the negative electrode, wherein the positive electrode includes a positive current collector and a positive active material layer disposed on the positive current collector, and wherein the negative electrode includes a negative current collector and a first negative active material layer disposed on the negative current collector.

The positive electrode may be, according to an embodiment, the same as described above.

All-Solid Secondary Battery

Figure 2:
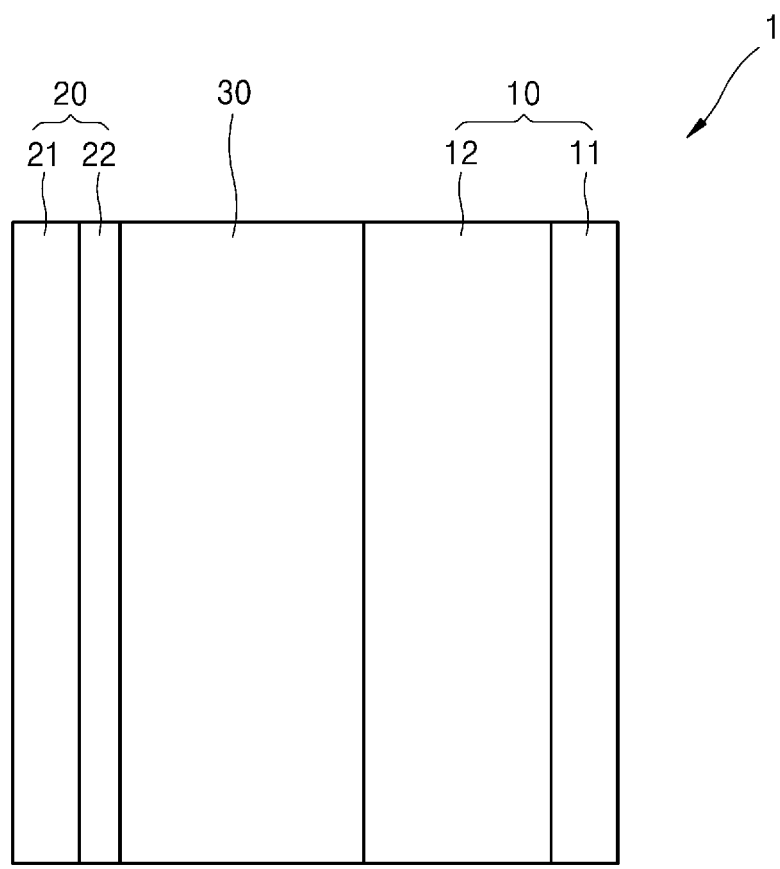
FIG. 2 shows a schematic structure of an all-solid secondary battery, according to an embodiment.

Referring to FIG. 2, an all-solid secondary battery 1 includes a positive electrode 10; a negative electrode 20; and a solid electrolyte layer 30 disposed between the positive electrode 10 and the negative electrode 20, wherein the positive electrode 10 includes a positive current collector 11 and a positive active material layer 12 disposed on the positive current collector 11, and wherein the negative electrode 20 includes a negative current collector 21 and a first negative active material layer 22 disposed on the negative current collector 21.

Positive Electrode: Positive Current Collector

The positive current collector 11 may be, for example, a plate or a foil formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. In some embodiments, the positive current collector 11 may be omitted.

Positive Electrode: Positive Active Material

The positive active material layer 12 may include, for example, a positive active material and a solid electrolyte. The solid electrolyte in the positive electrode 10 may be similar to or different from a solid electrolyte in the solid electrolyte layer 30. The solid electrolyte in the positive active material layer 12 may be understood from the description provided in relation to the solid electrolyte layer 30.

The positive active material may be a positive active material capable of reversibly absorbing and desorbing lithium ions. Examples of the positive active material include a lithium transition metal oxide (such as a lithium cobalt oxide (LCO), a lithium nickel oxide, a lithium nickel cobalt oxide, a lithium nickel cobalt aluminum oxide (NCA), a lithium nickel cobalt manganese oxide (NCM), a lithium manganate, and/or a lithium iron phosphate); a nickel sulfide; a copper sulfide; a lithium sulfide; an iron oxide; and a vanadium oxide, but embodiments are not limited thereto, and any material available as a positive active material in the art may be used. The positive active material may be used alone or in a mixture of at least two selected from these examples.

The lithium transition metal oxide may be, for example, a compound represented by one of the following formulae: $Li_aA_{1-b}B'_bD_2$ (where $0.90 \leq a \leq 1$ and $0 \leq b \leq 0.5$); $Li_aE_{1-b}B'_bO_{2-c}D_c$ (where $0.90 \leq a \leq 1$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); or $LiFePO_4$. In the compound, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof. The compounds may have a surface coating layer (hereinafter, also referred to as "coating layer"). In some embodiments, a mixture of a compound without a coating layer and a compound having a coating layer, the compounds being selected from the compounds listed above, may be used. In some embodiments, the coating layer may include at least one compound of a coating element selected from the group consisting of oxide, hydroxide, oxyhydroxide, oxycarbonate, and hydroxycarbonate (of the coating element). In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the positive active material when a compound of the coating element is used. For example, the coating layer may be formed using a spray coating method or a dipping method. The coating methods may be well understood by one of ordinary skill in the art, and thus a detailed description thereof will be omitted.

The positive active material may include, for example, a lithium salt of a transition metal oxide that has a layered rock-salt type structure (among the examples of the lithium transition metal oxide). The term "layered rock-salt type structure" refers to a structure in which an oxygen atom layer and a metal atom layer are alternately and regularly arranged in a <111> direction in a cubic rock-salt type structure, where each of the atom layers forms a two-dimensional flat plane. The term "cubic rock-salt type structure" refers to a sodium chloride (NaCl) type crystalline structure, in which face-centered cubic (fcc) lattices respectively formed of anions and cations are shifted by only a half of the ridge of each unit lattice. Non-limiting examples of the lithium transition metal oxide having the layered rock-salt type structure include a ternary lithium transition metal oxide expressed as $LiNi_xCo_yAl_zO_2$ (NCA) and $LiNi_xCo_yMn_zO_2$ (NCM) (where $0<x<1$, $0<y<1$, $0<z<1$, and $x+y+z=1$). When the positive active material includes a ternary transition metal oxide having the layered rock-salt type structure, an energy density and thermal stability of the all-solid secondary battery 1 may be improved.

The positive active material may be covered by a coating layer as described above. The coating layer is any material that may be used as a coating layer of a positive active material of an all-solid secondary battery in the art. The coating layer may be, for example, $Li_2O$—$ZrO_2$ (LZO).

When the positive active material includes nickel (Ni) in a ternary lithium transition metal oxide (such as in NCA and/or NCM), a capacity density of the all-solid secondary battery 1 may increase, and metal elution from the positive active material in a charged state may be reduced. As a result, the all-solid secondary battery 1 according to an embodiment may have improved cycle characteristics in a charged state.

The positive active material may have any suitable particle shape, such as a true spherical shape, an elliptical shape, or a substantially spherical shape. The positive active material may have any suitable particle diameter for a positive active material of an all-solid secondary battery. An amount of the positive active material of the positive electrode 10 is not particularly limited, and may be applicable to a positive electrode layer of an all-solid secondary battery as used in the art.

Positive Electrode: Solid Electrolyte

In some embodiments, the positive active material layer 12 may include a solid electrolyte. The solid electrolyte in the positive electrode layer 10 may be identical to (the same) or different from the solid electrolyte in the solid electrolyte layer 30. The solid electrolyte may be understood from the description provided in relation to the solid electrolyte layer 30.

An average particle diameter (D50) of the solid electrolyte in the positive active material layer 12 may be smaller than that of the solid electrolyte in the solid electrolyte layer 30. For example, an average particle diameter (D50) of the solid electrolyte in the positive active material layer 12 may be about 90% or less, about 80% or less, about 70% or less, about 60% or less, about 50% or less, about 40% or less, about 30% or less, or about 20% or less of the average particle diameter (D50) of the solid electrolyte in the solid electrolyte layer 30.

Positive Electrode: Binder

The positive active material layer 12 may include a binder. Non-limiting examples of the binder include styrene-butadiene rubber (SBR), polytetrafluoroethylene, polyvinylidene fluoride, and polyethylene.

Positive Electrode: Conducting Agent

The positive active material layer 12 may include a conducting agent. Non-limiting examples of the conducting agent include graphite, carbon black, acetylene black, ketjen black, carbon fiber, and metal powder.

Positive Electrode: Other Additives

In some embodiments, the positive electrode 10 may further include additives such as a filler, a coating agent, a dispersant, and/or an ionic conducting agent in addition to the positive active material, solid electrolyte, binder, and conducting agent described above.

The filler, coating agent, dispersant, and/or ion conducting agent that may be included in the positive electrode 10 may each independently be any suitable material used in an electrode of an all-solid secondary battery in the art.

In the positive electrode 10, an amount of the positive active material may be about 80 parts to about 93 parts by weight, an amount of the solid electrolyte may be about 5 parts to about 10 parts by weight, an amount of the conducting agent may be about 0.5 parts to about 5 parts by weight, for example, about 0.5 parts to about 1 part by weight, and an amount of the binder may be about 0.1 parts to about 5 parts by weight, for example, about 0.1 parts to about 2 parts by weight. Here, the amounts of the positive active material, solid electrolyte, binder, and conducting agent are each based on 100 parts by weight of the total weight of the positive electrode. The total weight of the positive electrode refers to the total amount of the positive active material, solid electrolyte, binder, and conducting agent.

A thickness of the positive electrode may be, for example, about 70 µm to about 150 µm.

Solid Electrolyte Layer

Solid Electrolyte Layer: Sulfide-Based Solid Electrolyte

Figure 3:
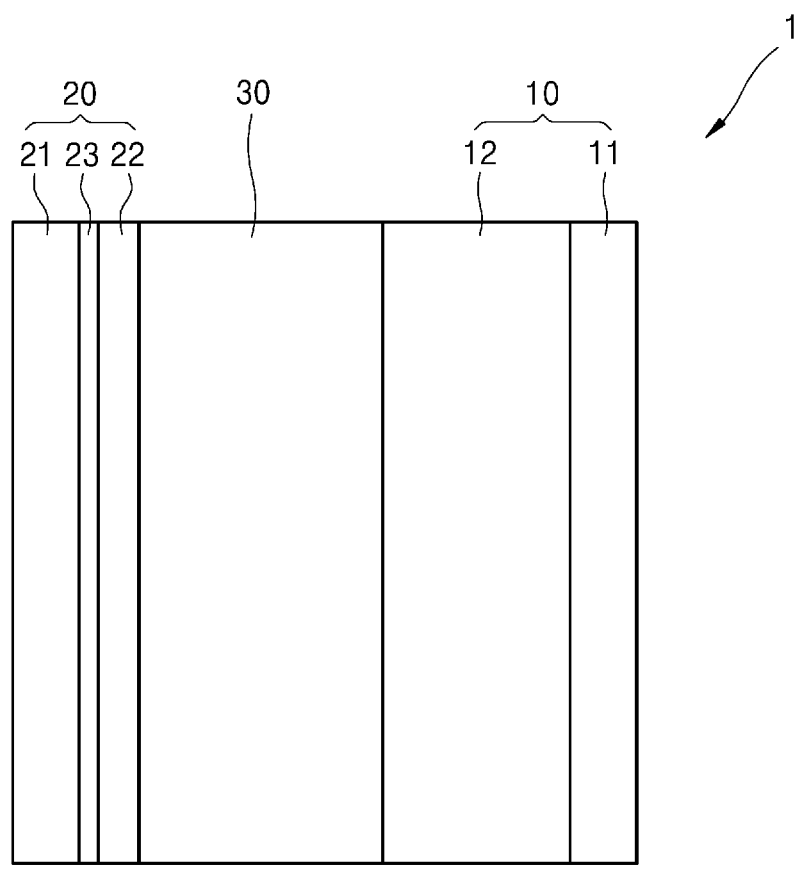
FIG. 3 shows a schematic structure of an all-solid secondary battery, according to another embodiment.
Figure 4:
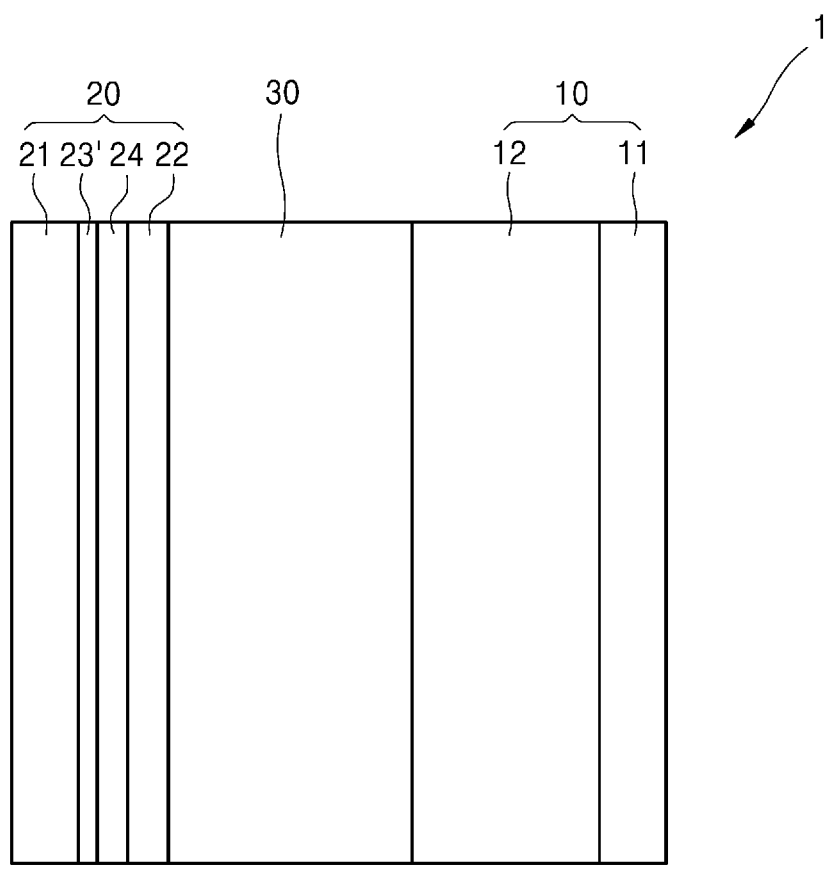
FIG. 4 shows a schematic structure of an all-solid secondary battery, according to another embodiment.

Referring to FIGS. 2 to 4, the solid electrolyte layer 30 includes a sulfide-based solid electrolyte disposed between the positive electrode 10 and the negative electrode 20.

The sulfide-based solid electrolyte may include, for example, at least one selected from $Li_2S$—$P_2S_5$, $Li_2S$—$P_2S_5$—LiX (where X is a halogen element), $Li_2S$—$P_2S_5$—

$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (where m and n each are a positive number, Z represents any of Ge, Zn, and Ga), $Li_2S$—$GeS_2$, $Li_2S$—$SiS_2$—$Li_3PO_4$, $Li_2S$—$SiS_2$-$Li_pMO_q$ (where p and q each are a positive number, M represents any of P, Si, Ge, B, Al, Ga, and In), $Li_{7-x}PS_{6-x}Cl_x$ (where 0≤x≤2), $Li_{7-x}PS_{6-x}Br_x$ (where 0≤x≤2), and $Li_{7-x}PS_{6-x}I_x$ (where 0≤x≤2). The sulfide-based solid electrolyte may be prepared by melting and quenching starting materials (e.g., $Li_2S$ or $P_2S_5$), or by mechanical milling the starting materials.

$Li_2S$—$P_2S_5$—LiX may be, for example, $Li_2S$—$P_2S_5$—LiCl or $Li_2S$—$P_2S_5$—LiCl—LiBr.

Subsequently, the resultant may be heat-treated. The sulfide-based solid electrolyte may be amorphous or crystalline and may be a mixed form thereof. Also, the sulfide-based solid electrolyte may include at least sulfur (S), phosphorus (P), and lithium (Li), as component elements among the sulfide-based solid electrolyte materials. For example, the sulfide-based solid electrolyte may be a material including $Li_2S$—$P_2S_5$. Here, when the material including $Li_2S$—$P_2S_5$ is used as a sulfide-based solid electrolyte material, a mixing molar ratio of $Li_2S$ and $P_2S_5$ ($Li_2S$:$P_2S_5$) may be, for example, about 50:50 to about 90:10.

The sulfide-based solid electrolyte may be, for example, an argyrodite-type compound including at least one selected from $Li_{7-x}PS_{6-x}Cl_x$ (where 0≤x≤2), $Li_{7-x}PS_{6-x}Br_x$ (where 0≤x≤2), and $Li_{7-x}PS_{6-x}I_x$ (where 0≤x≤2). In particular, the sulfide-based solid electrolyte may be an argyrodite-type compound including at least one selected from $Li_6PS_5Cl$, $Li_6PS_5Br$, and $Li_6PS_5I$.

A density of the argyrodite-type solid electrolyte may be about 1.5 g/cc to about 2.0 g/cc. When the density of the argyrodite-type solid electrolyte is about 1.5 g/cc or higher, the internal resistance of the all-solid secondary battery 1 may decrease, and penetration of the solid electrolyte layer 30 by Li (e.g., Li dendrites) may be effectively suppressed.

An elastic modulus of the solid electrolyte may be, for example, about 15 GPa to about 35 GPa.

Solid Electrolyte Layer: Binder

The solid electrolyte layer 30 may include, for example, a binder. Examples of the binder in the solid electrolyte layer 30 include styrene-butadiene rubber (SBR), polytetrafluoroethylene, polyvinylidene fluoride, and polyethylene, but embodiments are not limited thereto, and any material available as a binder in the art may be used. The binder of the solid electrolyte layer 30 may be identical to or different from the binders in the positive active material layer 12 and the negative active material layer 22.

A thickness of the solid electrolyte layer 30 may be, for example, about 30 μm to about 60 μm.

Negative Electrode
Negative Electrode: Negative Active Material

The first negative active material layer 22 may include, for example, a negative active material and a binder.

The negative active material in the first negative active material layer 22 may be, for example, in the form of particles. An average particle diameter of the negative active material in the form of particles may be, for example, about 4 μm or less, about 3 μm or less, about 2 μm or less, about 1 μm or less, or about 900 nm or less. An average particle diameter of the negative active material in the form of particles may be, for example, about 10 nm to about 4 μm, about 10 nm to about 3 μm, about 10 nm to about 2 μm, about 10 nm to about 1 μm, or about 10 nm to about 900 nm. When the average particle diameter of the negative active material is within these ranges, reversible absorption and/or desorption of lithium during charging/discharging may be further facilitated. The average particle diameter of the negative active material may be, for example, a median diameter (D50) measured by using a laser diffraction particle diameter distribution meter.

The negative active material in the first negative active material layer 22 may include, for example, at least one selected from a carbonaceous negative active material and a metal or metalloid negative active material.

In some embodiments, the carbonaceous negative active material may be amorphous carbon. Examples of the amorphous carbon include carbon black (CB), acetylene black (AB), furnace black (FB), ketjen black (KB), and graphene, but embodiments are not limited thereto, and any material available as amorphous carbon in the art may be used. The amorphous carbon is carbon having little crystallinity or a very low crystallinity (which is different from crystalline carbon and/or graphene-based carbon).

Examples of the metal or metalloid negative active material include at least one selected from the group consisting of gold (Au), platinum (Pt), palladium (Pd), silicon (Si), silver (Ag), aluminum (Al), bismuth (Bi), tin (Sn), and zinc (Zn), but embodiments are not limited thereto, and any material available as a metal negative active material or a metalloid negative active material capable of forming an alloy or a compound with lithium in the art may be used. For example, nickel (Ni) does not form an alloy with lithium and thus is not a metal negative active material.

The first negative active material layer 22 may include one negative active material, or may include a mixture of a plurality of different negative active materials selected from these negative active materials. For example, the first negative active material layer 22 may only include amorphous carbon or may include at least one selected from the group consisting of gold (Au), platinum (Pt), palladium (Pd), silicon (Si), silver (Ag), aluminum (Al), bismuth (Bi), tin (Sn), and zinc (Zn). In some embodiments, the first negative active material layer 22 may include a mixture including amorphous carbon and at least one element selected from the group consisting of gold (Au), platinum (Pt), palladium (Pd), silicon (Si), silver (Ag), aluminum (Al), bismuth (Bi), tin (Sn), and zinc (Zn). A mixed weight ratio of the mixture of amorphous carbon to element may be, for example, a weight ratio about 10:1 to about 1:2, about 5:1 to about 1:1, or about 4:1 to about 2:1, but embodiments are not limited thereto, and the mixing ratio may be selected according to characteristics of the all-solid secondary battery 1. When the negative active material has the above composition, cycle characteristics of the all-solid secondary battery 1 may be further improved.

The negative active material in the negative active material layer 22 may include, for example, a mixture including first particles formed of amorphous carbon and second particles formed of a metal or a metalloid. Non-limiting examples of the metal or metalloid include gold (Au), platinum (Pt), palladium (Pd), silicon (Si), silver (Ag), aluminum (Al), bismuth (Bi), tin (Sn), and zinc (Zn). In some embodiments, the metalloid may be a semiconductor. An amount of the second particles may be about 8 weight % to about 60 weight %, about 10 weight % to about 50 weight %, about 15 weight % to about 40 weight %, or about 20 weight % to about 30 weight % based on the total weight of the mixture. When the amount of the second particles is within these ranges, for example, cycle characteristics of the all-solid secondary battery 1 may be further improved.

Negative Electrode: Binder

Examples of the binder in the first negative active material layer 22 include styrene-butadiene rubber (SBR), polytetrafluoroethylene, polyvinylidene fluoride, polyethylene, a vinylidene fluoride/hexafluoropropylene copolymer, polyacrylonitrile, and polymethylmethacrylate, but embodiments are not limited thereto, and any material available as a binder in the art may be used. The binder may be formed of one of the examples of the binder alone or a plurality of different binders.

When the first negative active material layer 22 includes the binder, the first negative active material layer 22 may be stabilized on the negative current collector 21. Also, cracks in the first negative active material layer 22 may be suppressed or reduced, in spite of volume change and/or relative location change of the first negative active material layer 22 during charging/discharging. For example, when the first negative active material layer 22 does not include a binder, the first negative active material layer 22 may be easily separated from the negative current collector 21. When the negative current collector 21 is separated from the first negative active material layer 22 in one or more regions, the negative current collector 21 is exposed in those regions and may contact the solid electrolyte layer 30 such that that the risk of short-circuit may increase. The first negative active material layer 22 may be prepared by, for example, coating and drying a slurry for forming the first negative active material layer 22 on the negative current collector 21. When the binder is included in the first negative active material layer 22, the negative active material may be stably dispersed in the slurry. For example, when the slurry is coated on the negative current collector 21 utilizing a screen printing method, clogging of the screen (e.g., clogging by an aggregate of the negative active material) may be suppressed or reduced.

Negative Electrode: Other Additives

The first negative active material layer 22 may further include any suitable additives used in an all-solid secondary battery in the art, such as a filler, a coating agent, a dispersant, and/or an ionic conducting agent.

Negative Electrode: First Negative Active Material Layer

A thickness of the first negative active material layer 22 may be, for example, about 50% or less, about 40% or less, about 30% or less, about 20% or less, about 10% or less, or about 5% or less of a thickness of the positive active material layer 12. For example, a thickness of the first negative active material layer 22 may be about 1 μm to about 20 μm, about 2 μm to about 10 μm, or about 3 μm to about 7 μm. When the thickness of the first negative active material layer 22 is too thin, lithium dendrites formed between the first negative active material layer 22 and the negative current collector 21 may destroy the first negative active material layer 22, and thus cycle characteristics of the all-solid secondary battery 1 may not be improved. When the thickness of the first negative active material layer 22 is too thick, an energy density of the all-solid secondary battery 1 may be deteriorated and internal resistance of the all-solid secondary battery 1 by the first negative active material layer 22 may increase, and thus cycle characteristics of the all-solid secondary battery 1 may not be improved.

For example, when the thickness of the first negative active material layer 22 is decreased, a charge capacity of the first negative active material layer 22 may also decrease. The charge capacity of the first negative active material layer 22 may be, for example, about 50% or lower, about 40% or lower, about 30% or lower, about 20% or lower, about 10% or lower, about 5% or lower, or about 2% or lower of a charge capacity of the positive active material layer 12. The charge capacity of the first negative active material layer 22 may be, for example, =about 0.1% to about 50%, about 0.1% to about 40%, about 0.1% to about 30%, about 0.1% to about 20%, about 0.1% to about 10%, about 0.1% to about 5%, or about 0.1% to about 2% of a charge capacity of the positive active material layer 12. When the charge capacity of the first negative active material layer 22 is too low, a thickness of the first negative active material layer 22 is too thin, lithium dendrites formed between the first negative active material layer 22 and the negative current collector 21 during repeated charging/discharging processes may destroy the first negative active material layer 22, and thus cycle characteristics of the all-solid secondary battery 1 may not be improved. When the charge capacity of the first negative active material layer 22 is too high, an energy density of the all-solid secondary battery 1 may be deteriorated and internal resistance of the all-solid secondary battery 1 by the first negative active material layer 22 may increase, and thus cycle characteristics of the all-solid secondary battery 1 may not be improved.

The charge capacity of the positive active material layer 12 may be obtained by multiplying a weight of the positive active material in the positive active material layer 12 by a charge capacity density (mAh/g) of the positive active material. When various types of materials are used as the positive active material, a value of a charge capacity density×a weight of each of the positive active materials is calculated, and the total of these values is a charge capacity of the positive active material layer 12. A charge capacity of the first negative active material layer 22 may be calculated in substantially the same manner. That is, a charge capacity of the first negative active material layer 22 is obtained by multiplying a weight of the negative active material in the first negative active material layer 22 by a charge capacity density (mAh/g) of the negative active material. When various types of materials are used as the negative active material, a value of a charge capacity density×a weight of each of the negative active materials is calculated, and the total of these values is a charge capacity of the first negative active material layer 22. Here, the charge capacity densities of the positive active material and the negative active material are capacities estimated using an all-solid half-cell in which lithium metal is used as a counter electrode. The charge capacities of the positive active material layer 12 and the first negative active material layer 22 may be directly measured by charge capacity measurement using an all-solid half-cell. When the measured charge capacity is divided by a weight of each of the active materials, a charge capacity density may be obtained. In some embodiments, the charge capacities of the positive active material layer 12 and the first negative active material layer 22 may be initial charge capacities measured in the first charging cycle.

Negative Electrode: Second Negative Active Material Layer (Deposition Layer)

The all-solid secondary battery 1 may, for example, further include a second negative active material layer between the negative current collector 21 and the first negative active material layer 22. The all-solid secondary battery 1 may further include a second negative active material layer between the solid electrolyte layer 30 and the first negative active material layer 22 by (e.g., as a result of) charging. In some embodiments, the all-solid secondary battery 1 may further include, for example, a second negative active material layer between the negative current collector 21 and the first negative active material layer 22 and between the solid electrolyte layer 30 and the first negative active material layer 22 by charging. The second negative active material layer may be a metal layer including lithium or a lithium alloy. In this regard, for example, because the second negative active material layer is a metal layer including lithium, the second negative active material layer may serve as a lithium reservoir. Examples of the lithium alloy include a Li—Al alloy, a Li—Sn alloy, a Li—In alloy, a Li—Ag alloy, a Li—Au alloy, a Li—Zn alloy, a Li—Ge alloy, and a Li—Si alloy, but embodiments are not limited thereto, and any material available as a lithium alloy in the art may be used. In some embodiments, the second negative active material layer may be formed of lithium or the lithium alloy.

A thickness of the second negative active material layer may be, for example, about 1 µm to about 1000 µm, about 1 µm to about 500 µm, about 1 µm to about 200 µm, about 1 µm to about 150 µm, about 1 µm to about 100 µm, or about 1 µm to about 50 µm, but embodiments are not limited thereto. When the thickness of the second negative active material layer is too thin, the second negative active material layer may not serve as a lithium reservoir. When the thickness of the second negative active material layer is too thick, a weight and a volume of the all-solid secondary battery 1 may increase, and cycle characteristics may be deteriorated. The second negative active material layer may be, for example, a metal foil having a thickness within these ranges.

In the all-solid secondary battery 1, the second negative active material layer in some embodiments may be disposed between the negative current collector 21 and the first negative active material layer 22 before assembling the all-solid secondary battery 1, or in some embodiments may be deposited between the negative current collector 21 and the first negative active material layer 22 by charging after assembling the all-solid secondary battery 1. As shown in FIG. 3, when the second negative active material layer 23 is disposed between the negative current collector 21 and the first negative active material layer 22 before assembling the all-solid secondary battery 1, the second negative active material layer 23 is a metal layer including lithium and thus may serve as a lithium reservoir. For example, a lithium foil may be disposed between the negative current collector 21 and the first negative active material layer 22 before assembling the all-solid secondary battery 1. In this regard, the cycle characteristics of the all-solid secondary battery 1 including the second negative active material layer may be further improved. When the second negative active material layer is deposited by charging after assembling the all-solid secondary battery 1, an energy density of the all-solid secondary battery 1 may be increased, due to not including the second negative active material layer during the assembling of the all-solid secondary battery 1. For example, the all-solid secondary battery 1 may be charged over (above) the charge capacity of the first negative active material layer 22. In this regard, the first negative active material layer 22 may be overcharged. In the beginning of the charging, lithium is absorbed in the first negative active material layer 22. The negative active material in the first negative active material layer 22 may form an alloy or a compound with lithium ions migrated from the positive electrode layer 10. When the negative active material layer is charged over the charge capacity of the first negative active material layer 22, for example, lithium may be deposited on a back surface of the first negative active material layer 22 (e.g., between the negative current collector 21 and the first negative active material layer 22), and a metal layer corresponding to the second negative active material layer may be formed by the deposited lithium. The second negative active material layer is a metal layer mainly formed of lithium (i.e., metal lithium). In some embodiments, this is because the negative active material in the first negative active material layer 22 includes a material capable of forming an alloy or a compound with lithium. During discharging, lithium of the first negative active material layer 22 and the second negative active material layer (which is a metal layer), is ionized and diffuses toward the positive electrode layer 10. Thus, lithium may be used as a negative active material in the all-solid secondary battery 1. Because the first negative active material layer 22 covers the second negative active material layer, the first negative active material layer 22 may serve as a protection layer of the second negative active material layer, (e.g., the metal layer), and may thereby suppress deposition and/or growth of lithium dendrites at the same time. Thus, short-circuit and capacity deterioration of the all-solid secondary battery 1 may be suppressed or reduced, and, as a result, cycle characteristics of the all-solid secondary battery 1 may be improved. In some embodiments, when the second negative active material layer is formed by charging after the assembling of the all-solid secondary battery 1, the negative current collector 21, the first negative active material layer 22, and a region between the negative current collector 21 and the first negative active material layer 22 may be substantially Li-free regions e.g., not including lithium (Li) in the initial state or in a state after the discharging of the all-solid secondary battery 1.

Negative Electrode Layer: Third Negative Active Material Layer

Figure 5:
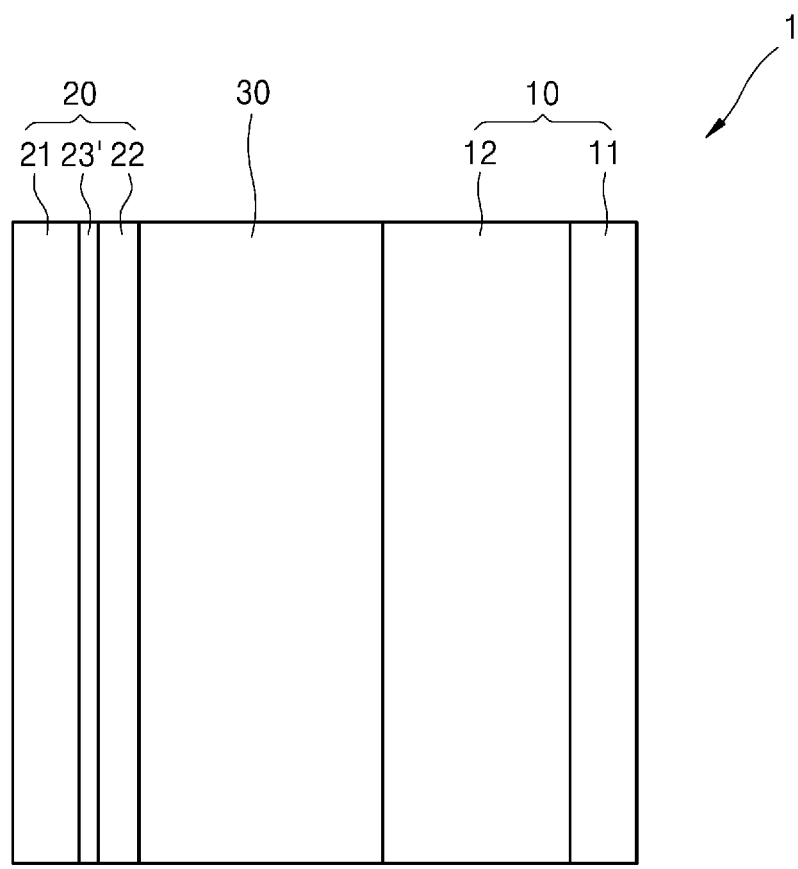
FIG. 5 shows a schematic structure of an all-solid secondary battery, according to another embodiment.

Referring to FIG. 5, in some embodiments the all-solid secondary battery 1 may include a third negative active material layer 23' between the negative current collector 21 and the first negative active material layer 22. The third negative active material layer 23' may be a metal layer including lithium or a lithium alloy. The metal layer includes lithium or a lithium alloy. In this regard, for example, because the third negative active material layer 23' is a metal layer including lithium, the third negative active material layer may serve as a lithium reservoir. Examples of the lithium alloy may include a Li—Al alloy, a Li—Sn alloy, a Li—In alloy, a Li—Ag alloy, a Li—Au alloy, a Li—Zn alloy, a Li—Ge alloy, and a Li—Si alloy, but embodiments are not limited thereto, and any material available as a lithium alloy in the art may be used. The third negative active material layer 23' may be formed of one of these alloys or lithium or may be formed of various alloys.

A thickness of the third negative active material layer 23' may be, for example, about 1 µm to about 100 µm, about 1 µm to about 50 µm, about 1 µm to about 40 µm, about 1 µm to about 30 µm, about 1 µm to about 20 µm, about 1 µm to about 15 µm, about 1 µm to about 10 µm, or about 1 µm to about 5 µm, but embodiments are not limited thereto. When the thickness of the third negative active material layer 23' is too thin, the third negative active material layer 23' may not serve as a lithium reservoir. When the thickness of the third negative active material layer 23' is too thick, a weight and a volume of the all-solid secondary battery 1 may increase, and cycle characteristics may be deteriorated. The third negative active material layer 23' may be, for example, a metal deposition layer or a metal foil having a thickness within these ranges.

As shown in FIG. 4, in some embodiments a lithium halide layer 24 may be further disposed on the third negative active material layer 23'. The lithium halide layer 24 may act as a passivation layer and may prevent or reduce deterioration of the third negative active material layer 23'. The lithium halide layer 24 is a high-strength and high-hardness layer, and thus may be a protecting layer that protects the third negative active material layer 23'. The lithium halide layer 24 may include at least one selected from LiF, LiCl, LiBr, and LiI. The lithium halide layer 24 may be a LiF layer. The lithium halide layer 24 may be disposed on the third negative active material layer 23' by deposition. A thickness of the lithium halide layer 24 may be, for example, about 10 μm to about 300 μm, about 10 μm to about 200 μm, about 10 μm to about 150 μm, about 10 μm to about 100 μm, about 10 μm to about 90 μm, about 10 μm to about 80 μm, about 10 μm to about 60 μm, or about 20 μm to about 50 μm, but embodiments are not limited thereto. When the thickness of the lithium halide layer 24 is too thin, the lithium halide layer 24 may not prevent or reduce deterioration of the third negative active material layer 23'. When the thickness of the lithium halide layer 24 is too thick, an energy density of the all-solid secondary battery 1 may be decreased.

In some embodiments, a carbon layer may be further disposed between the lithium halide layer 24 and the solid electrolyte layer 30. When the carbon layer is disposed between the lithium halide layer 24 and the solid electrolyte layer 30, interfacial resistance between the lithium halide layer 24 and the solid electrolyte layer 30 may be decreased. A thickness of the carbon layer may be, for example, about 1 μm to about 10 μm, about 2 μm to about 10 μm, or about 1 μm to about 5 μm. When the thickness of the carbon layer is too thin, interfacial resistance between the lithium halide layer 24 and the solid electrolyte layer 30 may not be effectively decreased. When the thickness of the carbon layer is too thick, an energy density of the all-solid secondary battery 1 may be decreased. The carbon layer may include a binder and a carbonaceous material. The carbonaceous material may include amorphous carbon or crystalline carbon. The binder may include a binder used in the positive electrode. The carbon layer may include both amorphous carbon and crystalline carbon (e.g., simultaneously). A weight ratio of the amorphous carbon and crystalline carbon in the carbon layer may be, for example, about 4:6 to about 6:4.

Negative Electrode: Negative Current Collector

The negative current collector 21 may be formed of, for example, a material that does not react with lithium, i.e., a material that does not form both an alloy and a compound (e.g. does not form an alloy and a compound simultaneously). Examples of the material forming the negative current collector 21 include copper (Cu), stainless steel, titanium (Ti), iron (Fe), cobalt (Co), and nickel (Ni), but embodiments are not limited thereto, and any material available as an electrode current collector in the art may be used. The negative current collector 21 may be formed of one of the examples of the metal or an alloy or a coating material of at least two metals. The negative current collector 21 may be, for example, in the form of a plate or a foil.

In some embodiments, the all-solid secondary battery 1 may further include, for example, a thin film including an element that is capable of forming an alloy with lithium on the negative current collector 21. The thin film may be disposed between the negative current collector 21 and the first negative active material layer 22. The thin film may, for example, include an element capable of forming an alloy with lithium. Examples of the element capable of forming an alloy with lithium include gold, silver, zinc, tin, indium, silicon, aluminum, and bismuth, but embodiments are not limited thereto, and any element capable of forming an alloy with lithium in the art may be used. The thin film may be formed of any of these metals or alloys of various metals.

When the thin film is disposed on the negative current collector 21, for example, the deposition form of a second negative active material layer deposited between the thin film and the first negative active material layer 22 may be further planarized, and thus cycle characteristics of the all-solid secondary battery 1 may be further improved.

A thickness of the thin film may be, for example, about 1 nm to about 800 nm, about 10 nm to about 700 nm, about 50 nm to about 600 nm, or about 100 nm to about 500 nm. When the thickness of the thin film is less than 1 nm, the above-described thin film functions may not be realized. When the thickness of the thin film is too thick, the thin film itself may absorb lithium, and a deposition amount of lithium in a negative electrode may decrease, resulting in deterioration of an energy density of the all-solid secondary battery 1, and thus cycle characteristics of the all-solid secondary battery 1 may be deteriorated. The thin film may be disposed on the negative current collector 21 by, for example, vacuum vapor deposition, sputtering, or plating, but embodiments are not limited thereto, and any method capable of forming a thin film in the art may be used.

An all-solid secondary battery according to an embodiment may be applied in a medium-to-large battery or an energy storage system (ESS). The all-solid secondary battery according to an embodiment may be, for example, used as a vehicle battery.

One or more embodiments will now be described in more detail with reference to the following examples. However, these examples are not intended to limit the scope of the one or more embodiments.

Preparation of Positive Active Material

Preparation Example 1: Preparation of Positive Active Material ($LiNi_{0.917}Co_{0.069}Al_{0.014}O_2$ (NCA)= (Core)+Co-Rich NCA (Shell)+$Li_2O$—$ZrO_2$ (LZO) Coating Layer) (Average Particle Diameter: About 16 μm)

First, NCA precursors were prepared.

Nickel sulfate ($NiSO_4$), cobalt sulfate ($CoSO_4$), and sodium hydroxide (NaOH) were mixed and co-precipitated at a temperature of about 45° C. and a pH of about 11.3, and thus a precipitate was obtained.

The precipitate was dried at a temperature of about 90° C. and divided into a large-particle nickel cobalt hydroxide $NiCo(OH)_2$ having a size of about 18 μm and a small-particle nickel cobalt hydroxide $NiCo(OH)_2$ having a size of about 3 μm.

150 g of the large-particle nickel cobalt hydroxide $NiCo(OH)_2$, 42 g of lithium hydroxide ($LiOH·H_2O$), and 1.2 g of aluminum hydroxide ($Al(OH)_3$) were mixed to prepare a mixture, and the mixture was heat-treated in oxygen at a temperature of about 750° C. for about 12 hours, and thus $LiNi_{0.960}Co_{0.028}Al_{0.012}O_2$ (NCA) was obtained.

Cobalt sulfate ($CoSO_4$) and sodium hydroxide (NaOH) were added to $LiNi_{0.960}Co_{0.028}Al_{0.012}O_2$ (NCA) to prepare a mixture, and the mixture was heat-treated in the air at a temperature of about 730° C., and thus a positive active material having a $Co(OH)_2$ coating layer thereon was obtained. When a positive active material is prepared as described above, cobalt coating may be performed while removing residual carbon on a surface of the heat-treated NCA.

A core of the positive active material contained $LiNi_{0.966}Co_{0.028}Al_{0.006}O_2$ (NCA), and a shell of the positive active material contained $LiNi_{0.563}Co_{0.430}Al_{0.007}O_2$, which is Co-rich NCA. An amount of the Co-rich NCA (LiNi$_{0.563}$Co$_{0.430}$Al$_{0.007}$O$_2$) of the shell was about 7 parts by weight based on 100 parts by weight of the total weight of a nickel-based active material including a core and a shell.

An average particle diameter of the positive active material obtained as described above was about 16 μm.

Separately, lithium methoxide and zirconium propoxide were stirred and mixed for 30 minutes in a solution mixture including ethanol and ethyl acetoacetate, and thus an alcohol solution of aLi$_2$O—ZrO$_2$ (where a=1) (aLi$_2$O—ZrO$_2$-coating solution) was prepared. Here, an amount of lithium methoxide and zirconium propoxide, that is an amount of aLi$_2$O—ZrO$_2$ (where a=1) coated on a surface of the positive active material, was controlled to be about 0.4 parts by weight based on 100 parts by weight of the total weight of aLi$_2$O—ZrO$_2$ (where a=1) and the nickel-based active material including a core and a shell.

Next, the aLi$_2$O—ZrO$_2$-coating solution was mixed with the positive active material fine powder, and this solution mixture was heated to about 40° C. while stirring to evaporate and dry a solvent such as alcohol. At this time, the mixture solution was irradiated with ultrasonic waves.

In this regard, a precursor of aLi$_2$O—ZrO$_2$ was supported on a particle surface of the positive active material fine powder.

Also, the precursor of aLi$_2$O—ZrO$_2$ supported on the particle surface of the positive active material fine powder was heat-treated at a temperature of about 350° C. for about 1 hour under oxygen atmosphere. During this heat-treatment, the precursor of aLi$_2$O—ZrO$_2$ (where a=1) existing on the positive active material was changed to aLi$_2$O—ZrO$_2$ (where a=1). An amount of Li$_2$O—ZrO$_2$ (LZO) was about 0.4 parts by weight based on 100 parts by weight of the total weight of NCA and LZO.

According to the above-described preparation process, NCA (core)+Co-rich NCA (shell)+Li$_2$O—ZrO$_2$ (LZO) (coating layer) were obtained. A composition of NCA of the core was LiNi$_{0.966}$Co$_{0.028}$Al$_{0.006}$O$_2$, a composition of Co-rich NCA was LiNi$_{0.563}$Co$_{0.430}$Al$_{0.007}$O$_2$, and a composition of the positive active material containing a core and a shell was LiNi$_{0.917}$Co$_{0.069}$Al$_{0.014}$O$_2$ (NCA).

Preparation Example 2: Preparation of Positive Active Material {LiNi$_{0.896}$Co$_{0.072}$Al$_{0.031}$O$_2$(Average Particle Diameter: About 3 μm)={NCA(Core)+Co-Rich NCA(Shell)+Li$_2$O—ZrO$_2$(LZO) Coating Layer}(Average Particle Diameter: About 3 μm)

LiNi$_{0.896}$Co$_{0.072}$Al$_{0.032}$O$_2$ (NCA) (average particle diameter: about 3 μm) was obtained in substantially the same manner as in the preparation method of LiNi$_{0.917}$Co$_{0.069}$Al$_{0.014}$O$_2$ (NCA) (average particle diameter: about 16 μm) of Preparation Example 1, except that a small-particle nickel cobalt hydroxide NiCo(OH)$_2$ having a size of about 3 μm (obtained in substantially the same manner as in Preparation Example 1) was used instead of a large-particle nickel cobalt hydroxide NiCo(OH)$_2$ having a size of about 18 μm, and the amounts of the positive active material precursors, nickel cobalt hydroxide NiCo(OH)$_2$, lithium hydroxide, LiOH·H$_2$O, and aluminum hydroxide, Al(OH)$_3$, were each stoichiometrically adjusted to obtain the desired positive active material LiNi$_{0.896}$Co$_{0.072}$Al$_{0.032}$O$_2$ (NCA). Here, LiNi$_{0.896}$Co$_{0.072}$Al$_{0.032}$O$_2$ denotes the total composition of a core and a shell of the positive active material.

Preparation Example 3: Preparation of Positive Active Material {LiNi$_{0.896}$Co$_{0.072}$Mn$_{0.032}$O$_2$=NCM (Core)+Co-Rich NCM(Shell)+Li$_2$O—ZrO$_2$ (LZO) Coating Layer}(Average Particle Diameter: About 16 μm)

LiNi$_{0.896}$Co$_{0.072}$Al$_{0.032}$O$_2$ (NCA) (average particle diameter: about 16 μm) was obtained in substantially the same manner as in the preparation method of LiNi$_{0.917}$Co$_{0.069}$Al$_{0.014}$O$_2$ (NCA) (average particle diameter: about 16 μm) of Preparation Example 1, except that manganese hydroxide was used instead of aluminum hydroxide, Al(OH)$_3$, and that the amounts of the positive active material precursors, nickel cobalt hydroxide NiCo(OH)$_2$, lithium hydroxide, LiOH·H$_2$O, and manganese hydroxide were each stoichiometrically adjusted to obtain the desired positive active material LiNi$_{0.896}$Co$_{0.072}$Mn$_{0.032}$O$_2$ (NCA).

Preparation Example 4: Preparation of Positive Active Material{LiNi$_{0.896}$Co$_{0.072}$Mn$_{0.032}$O$_2$=NCM (Core)+Co-Rich NCM(Shell)+Li$_2$O—ZrO$_2$ (LZO) Coating Layer}(Average Particle Diameter: About 16 μm)

A positive active material was obtained in substantially the same manner as in Preparation Example 3, except that the amounts of the positive active material precursors were each stoichiometrically adjusted to obtain the desired positive active material LiNi$_{0.896}$Co$_{0.072}$Mn$_{0.032}$O$_2$ (NCA) (average particle diameter: about 3 μm).

A core of the positive active material included LiNi$_{0.95}$Co$_{0.03}$Mn$_{0.02}$O$_2$, a shell of the positive active material included LiNi$_{0.53}$Co$_{0.45}$Mn$_{0.02}$O$_2$, Co-rich NCM was LiNi$_{0.53}$Co$_{0.45}$Mn$_{0.02}$O$_2$, and a composition of the positive active material containing the core and the shell was LiNi$_{0.896}$Co$_{0.072}$Mn$_{0.032}$O$_2$.

Preparation of all-Solid Secondary Battery

Example 1

Preparation of Positive Electrode

The first positive active material (LiNi$_{0.966}$Co$_{0.028}$Al$_{0.007}$O$_2$ (NCA)(core)+Co-rich NCA (shell)+Li$_2$O—ZrO$_2$ (LZO) coating layer) (average particle diameter: about 16 μm) prepared as in Preparation Example 1 and the second positive active material (LiNi$_{0.917}$Co$_{0.069}$Al$_{0.014}$O$_2$ (NCA) having Li$_2$O—ZrO$_2$ (LZO) coating layer (average particle diameter: about 3 μm)) prepared as in Preparation Example 2 were mixed at a weight ratio of about 2:8, and thus a positive active material was prepared.

An argyrodite-type crystal material, i.e., a Li$_6$PS$_5$Cl solid electrolyte (D50=0.6 μm, crystalline), was prepared as a solid electrolyte. A polytetrafluoroethylene (PTFE) binder (TEFLON® binder available from DuPont) was prepared as a binder. Carbon nanofibers (CNFs) were prepared as a conducting agent. The positive active material, the solid electrolyte, the conducting agent, and the binder were mixed at a weight ratio of about 89:8.8:1.2:1.0 with a xylene solvent to prepare a positive active material composition, and the composition was molded into the sheet form and then vacuum-dried at about 40° C. for about 8 hours, and thus a positive active material layer was prepared.

The positive active material layer was stacked on a carbon-coated Al current collector and pressed by a roll-press, and thus a positive electrode was prepared.

Preparation of Negative Electrode

A stainless steel (SUS) foil having a thickness of about 10 μm was prepared as a negative current collector.

6 g of carbon black (CB) having a primary particle diameter of about 30 nm was added to a container, and 8 g of an N-methyl pyrrolidine (NMP) solution including 5 weight % of a PVDF binder (#9300 available from Kureha) was added thereto to prepare a mixed solution. Then, the mixed solution was stirred while gradually adding NMP to prepare a slurry. The prepared slurry was coated on a Ni current collector using a bar coater and dried in the air at about 80° C. for about 10 minutes, and thus a carbon layer containing carbon black and silver was formed. A thickness of the carbon layer was about 3 μm.

A negative electrode was prepared as described above. A thickness of the first negative active material layer having a multi-layer structure of lithium metal layer/LiAg alloy layer/carbon layer in the negative electrode was about 38 μm.

Preparation of Solid Electrolyte Layer 99 parts by weight of a Li-argyrodite ($Li_6PS_5Cl$, $D_{50}=3$ μm, crystalline), 1 part by weight of poly(styrene-co-butyl acrylate) (molar ratio of 8:2), which is an acryl-based binder, and 495 parts by weight of xylene were mixed in a Thinky mixer (1300 rpm, 5 min) to prepare a positive electrode active material slurry. A layer was formed on non-woven fabric (thickness: 15 μm) on release-type polyethylene terephthalate (PET) (thickness: 75 μm) using the slurry and a bar coater, a liquid component was evaporated in a convection oven (80° C., 10 min), and the resultant was dried in a vacuum oven (40° C., 10 hr) to prepare a solid electrolyte layer (thickness before pressing: 90 μm, thickness after WIP pressing: 45 μm).

Preparation of all-Solid Secondary Battery

The negative electrode obtained as described above, the solid electrolyte layer, and the positive electrode were sequentially stacked to prepare a laminated body. The laminated body was plate-pressed at a pressure of about 500 MPa for about 1 min to prepare a unit cell of negative electrode/solid electrolyte layer/positive electrode. By this pressing, the solid electrolyte layer was sintered to improve battery characteristics. A thickness of the sintered solid electrolyte layer was about 45 μm.

Example 2

An all-solid secondary battery was prepared in substantially the same manner as in Example 1, except that uncoated NCA was used as a first positive active material instead of NCA having a $Li_2O$—$ZrO_2$ (LZO) coating layer.

Example 3

An all-solid secondary battery was prepared in substantially the same manner as in Example 1, except that uncoated NCA was used as a second positive active material instead of NCA having a $Li_2O$—$ZrO_2$ (LZO) coating layer.

Example 4

An all-solid secondary battery was prepared in substantially the same manner as in Example 1, except that NCM prepared as a first positive active material in Preparation Example 3 and NCM prepared as a second positive active material in Preparation Example 4 were used instead of $LiNi_{0.917}Co_{0.069}Al_{0.014}O_2$ (NCA) (average particle diameter: about 16 μm) having a $Li_2O$—$ZrO_2$ (LZO) coating layer prepared as a first positive active material in Preparation Example 1 and $LiNi_{0.917}Co_{0.069}Al_{0.014}O_2$ (NCA) (average particle diameter: about 3 μm) having a $Li_2O$—$ZrO_2$ (LZO) coating layer prepared as a second positive active material in Preparation Example 2, each respectively.

Examples 5 and 6

Additional all-solid secondary batteries were prepared in substantially the same manner as in Example 1, except that mixture weight ratios of the first positive active material to the second positive active material were changed to 7:3 and 6:4, respectively.

Example 7 (Examples 7-1 to 7-4)

An all-solid secondary battery (in each of the examples in Table 1) was prepared in substantially the same manner as in Example 1, except that average particle diameters of the first positive active material and the second positive active material were changed as shown in Table 1.

TABLE 1

| Sample | Average particle diameter of first positive active material (μm) | Average particle diameter of second positive active material (μm) |
| --- | --- | --- |
| Example 7-1 | 15 | 3 |
| Example 7-2 | 20 | 3 |
| Example 7-3 | 16 | 2 |
| Example 7-4 | 16 | 6 |

Comparative Example 1

An all-solid secondary battery was prepared as in Example 1, except that only $LiNi_{0.917}Co_{0.069}Al_{0.014}O_2$ (NCA) (average particle diameter: about 3 μm) having a $Li_2O$—$ZrO_2$ (LZO) coating layer was used as a positive active material.

Comparative Example 2

An all-solid secondary battery was prepared as in Example 1, except that only $LiNi_{0.917}Co_{0.069}Al_{0.014}O_2$ (NCA) (average particle diameter: about 16 μm) having a $Li_2O$—$ZrO_2$ (LZO) coating layer was used as a positive active material.

Comparative Example 3

An all-solid secondary battery was prepared as in Example 1, except that uncoated $LiNi_{0.917}Co_{0.069}Al_{0.014}O_2$ (NCA) (average particle diameter: about 16 μm) was used as a first positive active material, and uncoated $LiNi_{0.896}Co_{0.072}Al_{0.032}O_2$ (NCM) (average particle diameter: about 3 μm) as a second positive active material.

Comparative Example 4

An all-solid secondary battery was prepared as in Example 4, except that a positive active material was obtained by mixing uncoated (NCA) (average particle diameter: about 16 μm), i.e. a first positive active material, and uncoated (NCM) (average particle diameter: about 3 μm), i.e. a second positive active material, at a weight ratio of about 2:8.

Evaluation Example 1: Mixture Density

Mixture densities of the positive electrodes prepared in Example 1 and Comparative Example 1 were evaluated using a thickness gauge, and the results are shown in Table 2.

Evaluation Example 2: Efficiency and Lifetime Characteristics

Charge and discharge characteristics of the all-solid secondary batteries prepared in Examples 1 to 4 and Comparative Examples 1 to 4 were evaluated using a charger/discharger (model: TOYO-3100, available from TOYO).

In the first charging/discharging cycle, the batteries were each charged with a constant current of about 0.1C until a voltage of the battery was about 4.25 V, and then charged with a constant voltage until a current was about 0.05C. The completely charged cell was then rested for about 10 minutes, and discharged with a constant current of about 0.1C until a voltage of the battery was about 2.5 V. In the second charging/discharging cycle, the battery was charged with a constant current of about 0.2C until a voltage of the battery was about 4.25 V, and then charged with a constant voltage until a current was about 0.05C. The completely charged cell was then rested for about 10 minutes, and discharged with a constant current of about 0.2C until a voltage of the battery was about 2.5 V.

The lifetime evaluation of the batteries was performed by running 100 cycles, where in each of the 100 cycles, the battery was charged with a constant current of about 1C until a voltage of the battery was about 4.25 V and then charging the battery with a constant voltage until a current was about 0.05C. The completely charged cell was then rested for about 10 minutes, and discharged with a constant current of about 1 C until a voltage of the battery was about 2.5 V.

A capacity retention ratio (CRR) of the battery was calculated as defined in Equation 1, and a charge/discharge efficiency was calculated as defined in Equation 2, and the results of the capacity retention ratios and the charge/discharge efficiencies are shown in Table 2.

Capacity retention ratio (lifetime)[%]=[Discharge capacity of $200^{th}$ cycle/discharge capacity of $1^{st}$ cycle]×100    Equation 1

Charge/discharge efficiency=[Average driving voltage of $100^{th}$ cycle/average driving voltage of $1^{th}$ cycle]×100.    Equation 2

Evaluation Example 3: High-Rate Characteristics

Each of the all-solid secondary batteries was charged/discharged with 0.33C, 1.0C, and 2.0C in a range of about 2.5 V to about 4.25 V, and the discharge capacities according to C-rates of the batteries are shown in Table 2. Also, a ratio of a discharge capacity when the C-rate was 1.0C to a discharge capacity when the C-rate was 0.33C is shown in Table 2.

Evaluation Example 4: Average Voltage

The all-solid secondary batteries prepared in Example 1 and Comparative Example 1 were each charged/discharged at about 0.2C rate in a range of about 3.0 V to about 4.2 V, and a voltage of the battery in a 50% depth of charge (DOC) state (a charge average voltage) and a voltage of the battery in a 50% depth of discharge (DOD) state (a discharge average voltage) were measured and provided as a range. The results are shown in Table 2. Also, a difference between the charge average voltage and the discharge average voltage can be calculated as a voltage difference.

TABLE 2

| Sample | Discharge capacity (mAh/g) | | | discharge capacity @ 1 C/ discharge capacity @ 0.33 C | Lifetime retention rate % @ $100^{th}$ | Current density @ 0.33 C | Mixture density | Average voltage |
|---|---|---|---|---|---|---|---|---|
| | 0.33 C | 1.0 C | 2.0 C | (%) | cycle | mAh/cm² | g/cm³ | V |
| Example 1 | 180 | 166 | 107 | 92 | 90% | 5.41 | 3.50 | 3.82 to 3.84 |
| Comparative Example 1 | 185 | 126 | 46 | 68 | 70% | 5.58 | 3.22 | 3.70 to 3.78 |

Referring to Table 2, it can be seen that the all-solid secondary battery prepared in Example 1 had a high mixture density of the positive electrode compared to the all-solid secondary battery prepared in Comparative Example 1, and thus resistance of the electrode plate in the all-solid secondary battery prepared in Example 1 is decreased, which improved the charge/discharge capacity and lifetime and high-rate characteristics of the battery compared to the all-solid secondary battery prepared in Comparative Example 1.

The charge/discharge capacity, lifetime, and high-rate characteristics of the all-solid secondary batteries prepared in Examples 2 to 6 were evaluated in substantially the same manner as performed on the all-solid secondary battery prepared in Example 1. The all-solid secondary batteries prepared in Examples 2 to 6 had charge/discharge capacity, lifetime, and high-rate characteristics equivalent (e.g., similar) to those of the all-solid secondary battery prepared in Example 1.

Evaluation Example 5: Particle Size and Particle Distribution Characteristics

The particle size distribution characteristics of the positive active material of Example 1 and the second positive active material of Example 5 were obtained by utilizing a light transmission particle size distribution measuring device (SA-CP3 available from Shimazu Seisakusho Ltd.), and the results are shown in Table 3.

TABLE 3

| Sample | Particle size (um) | | Weight ratio of large-size particles to small-size | PSD | | |
|---|---|---|---|---|---|---|
| | Large-size particles | Small-size particles | | D10 (μm) | D50 (μm) | D90 (μm) |
| Preparation Example 1 | 100 | — | 100:0 | 6.5 | 14.0 | 20.2 |
| Example 1 | 18 μm | 3 μm | 80:20 | 4.8 | 15.0 | 22.1 |
| Example 5 | 18 μm | 3 μm | 70:30 | 3.7 | 11.3 | 18.2 |

As described above, according to one or more embodiments, an all-solid secondary battery may have improved resistance and current density characteristics of an electrode, and thus high-rate characteristics and lifetime characteristics of the battery may be improved.

As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that various changes in form and details may be made therein without departing from the spirit and scope of the disclosure as defined by the following claims and equivalents thereof.

What is claimed is:

1. A positive electrode for an all-solid secondary battery including a sulfide-based solid electrolyte, the positive electrode comprising:
a first positive active material having an average particle diameter of about 15 μm to about 20 μm,
a second positive active material having an average particle diameter of about 2 μm to about 6 μm, and
a solid electrolyte,
wherein at least one selected from the first positive active material and the second positive active material comprises a coating layer, the coating layer comprising a lithium ion conductor,
wherein each of the first positive active material and the second positive active material comprises a core and a shell,
wherein the shell of the first positive active material or the second positive active material comprises a nickel-based active material comprising cobalt (Co), and
wherein the core of the first positive active material or the second positive active material comprises a nickel-based active material with less cobalt (Co) than that of the corresponding shell.

2. The positive electrode of claim 1, wherein an amount of cobalt in the nickel-based active material of the shell is about 30 mol % or higher.

3. The positive electrode of claim 1, wherein the lithium ion conductor is a lithium zirconium oxide, a lithium titanium oxide, a lithium niobium oxide, a lithium lanthanum oxide, a lithium cerium oxide, or a combination thereof.

4. The positive electrode of claim 1, wherein the lithium ion conductor is a compound represented by Formula 1:

$$aLi_2O\text{—}ZrO_2,\qquad \text{Formula 1}$$

and wherein, in Formula 1, $0.1 \le a \le 2.0$.

5. The positive electrode of claim 1, wherein the nickel-based active material in the shell is a compound represented by Formula 2:

$$Li_aNi_{1-x-y-z}Co_xM1_yM2_zO_2,\qquad \text{Formula 2}$$

and wherein, in Formula 2, M1 is manganese (Mn) or aluminum (Al),
M2 is boron (B), magnesium (Mg), calcium (Ca), strontium (Sr), barium (Ba), titanium (Ti), vanadium (V), chromium (Cr), iron (Fe), copper (Cu), zirconium (Zr), aluminum (Al), or a combination thereof, and
$0.9 \le a \le 1.3$, $0.3 \le x \le 0.6$, $0.002 \le y \le 0.05$, $0 \le z < 1$, and $x+y+z<1$.

6. The positive electrode of claim 1, wherein an amount of the first positive active material is about 60 parts to about 80 parts by weight based on 100 parts by weight of a total weight of the first positive active material and the second positive active material.

7. The positive electrode of claim 1, wherein the core of the first positive active material and the core of the second positive active material are each a compound represented by Formula 3:

$$Li_a(Ni_{1-x-y-z}Co_xM1_yM2_z)O_2,\qquad \text{Formula 3}$$

and wherein, in Formula 3, M1 is manganese (Mn), aluminum (Al), or a combination thereof,
M2 is boron (B), magnesium (Mg), calcium (Ca), strontium (Sr), barium (Ba), titanium (Ti), vanadium (V), chromium (Cr), iron (Fe), copper (Cu), zirconium (Zr), aluminum (Al), or a combination thereof, and
$0.9 \le a \le 1.3$, $x \le (1-x-y-z)$, $y \le (1-x-y-z)$, $0 < x < 1$, $0 \le y < 1$, and $0 \le z < 1$.

8. The positive electrode of claim 7, wherein an amount of nickel (Ni) in the compound represented by Formula 3 is about 80 mol % to about 98 mol %.

9. The positive electrode of claim 1, wherein an amount of the lithium ion conductor is about 0.1 parts to about 5 parts by weight based on 100 parts by weight of a total weight of the nickel-based active material and the lithium ion conductor.

10. The positive electrode of claim 1, wherein a mixture density of the positive electrode is about 3.4 g/cm³ to about 3.7 g/cm³.

11. A positive electrode for an all-solid secondary battery including a sulfide-based solid electrolyte, the positive electrode comprising:
- a first positive active material having an average particle diameter of about 15 μm to about 20 μm,
- a second positive active material having an average particle diameter of about 2 μm to about 6 μm, and
- a solid electrolyte,
- wherein at least one selected from the first positive active material and the second positive active material comprises a coating layer, the coating layer comprising a lithium ion conductor,
- wherein each of the first positive active material and the second positive active material comprises a core and a shell,
- wherein the shell of the first positive active material or the second positive active material comprises a nickel-based active material comprising cobalt (Co), and
- wherein the solid electrolyte is about 5 parts to about 10 parts by weight based on 100 parts by weight of a total weight of the positive electrode.

12. A positive electrode for an all-solid secondary battery including a sulfide-based solid electrolyte, the positive electrode comprising:
- a first positive active material having an average particle diameter of about 15 μm to about 20 μm,
- a second positive active material having an average particle diameter of about 2 μm to about 6 μm, and
- a solid electrolyte,
- wherein at least one selected from the first positive active material and the second positive active material comprises a coating layer, the coating layer comprising a lithium ion conductor,
- wherein each of the first positive active material and the second positive active material comprises a core and a shell,
- wherein the shell of the first positive active material or the second positive active material comprises a nickel-based active material comprising cobalt (Co), and
- wherein an amount of the nickel-based active material in the shell is about 0.1 parts to about 10 parts by weight based on 100 parts by weight of a total weight of the nickel-based active material of the corresponding core and the nickel-based active material of the corresponding shell.

13. An all-solid secondary battery comprising:
the positive electrode of claim 1;
a negative electrode; and
a solid electrolyte layer between the positive electrode and the negative electrode,
wherein the solid electrolyte layer comprises the sulfide-based solid electrolyte.

14. The all-solid secondary battery of claim 13, wherein the sulfide-based solid electrolyte is at least one selected from $Li_2S-P_2S_5$, $Li_2S-P_2S_5-LiCl$, $Li_2S-P_2S_5-LiBr$, $Li_2S-P_2S_5-LiCl-LiBr$, $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (where m and n are each a positive number, and Z is one of Ge, Zn, or Ga), $Li_2S-GeS_2$, $Li_2S-SiS_2-Li_3PO_4$, $Li_2S-SiS_2-Li_pMO_q$ (where p and q are each a positive number, and M is one of P, Si, Ge, B, Al, Ga, or In), $Li_{7-x}PS_{6-x}Cl_x$ (where 0≤x≤2), $Li_{7-x}PS_{6-x}Br_x$ (where 0≤x≤2), and $Li_{7-x}PS_{6-x}I_x$ (where 0≤x≤2).

15. The all-solid secondary battery of claim 13, wherein the negative electrode comprises a negative current collector and a first negative active material layer on the negative current collector, and
wherein the first negative active material layer comprises a negative active material and a binder, the negative active material is in a form of particles, and an average particle diameter of the negative active material is about 4 μm or less.

16. The all-solid secondary battery of claim 15, wherein the negative active material comprises at least one selected from a carbonaceous negative active material, a metal negative active material, and a metalloid negative active material, and
wherein the carbonaceous negative active material comprises at least one selected from amorphous carbon and crystalline carbon.

17. The all-solid secondary battery of claim 13, wherein the solid electrolyte in the positive electrode is identical to the sulfide-based solid electrolyte.

18. The all-solid secondary battery of claim 13, wherein an amount of cobalt in the nickel-based active material of the shell is about 30 mol % or higher.

19. The all-solid secondary battery of claim 13, wherein the lithium ion conductor is a lithium zirconium oxide, a lithium titanium oxide, a lithium niobium oxide, a lithium lanthanum oxide, a lithium cerium oxide, or a combination thereof.

20. The all-solid secondary battery of claim 13, wherein the solid electrolyte in the positive electrode is about 5 parts to about 10 parts by weight based on 100 parts by weight of a total weight of the positive electrode.

* * * * *

UNITED STATES PATENT AND TRADEMARK OFFICE
CERTIFICATE OF CORRECTION

| | |
|---|---|
| PATENT NO. | : 11,909,043 B2 |
| APPLICATION NO. | : 17/190733 |
| DATED | : February 20, 2024 |
| INVENTOR(S) | : Taeri Kwon |

It is certified that error appears in the above-identified patent and that said Letters Patent is hereby corrected as shown below:

In the Claims

In Column 26, Line 55, in Claim 7, delete "0.9" and insert -- 0.95 --.

Signed and Sealed this
Twenty-fifth Day of June, 2024

Katherine Kelly Vidal
*Director of the United States Patent and Trademark Office*